United States Patent [19]
Holmes

[11] Patent Number: 4,855,588
[45] Date of Patent: Aug. 8, 1989

[54] CYLINDRICAL WIDE FIELD RECEIVER ELEMENT

[75] Inventor: Alan W. Holmes, Santa Barbara, Calif.

[73] Assignee: Santa Barbara Research Center, Goleta, Calif.

[21] Appl. No.: 124,725

[22] Filed: Nov. 24, 1987

[51] Int. Cl.$^4$ .............................................. G01V 1/20
[52] U.S. Cl. .................................. 250/203 R; 356/141
[58] Field of Search ........................ 250/203, 203 S; 356/141, 152; 126/425

[56] References Cited

U.S. PATENT DOCUMENTS

| | | | |
|---|---|---|---|
| 4,315,690 | 2/1985 | Trocellier et al. | 250/203 R |
| 4,325,633 | 4/1982 | Gardner | 356/141 |
| 4,385,833 | 5/1983 | Gardner | 356/141 |
| 4,484,565 | 11/1984 | Mori | 250/203 S |

FOREIGN PATENT DOCUMENTS 0041146 12/1981 European Pat. Off. ............ 356/141

Primary Examiner—David C. Nelms
Attorney, Agent, or Firm—M. J. Meltzer; W. C. Schubert

[57] ABSTRACT

A wide-field optical receiver element for determining the direction of a distant source of electromagnetic radiation. A cylindrical reflecting surface is used in an off-axis configuration to produce line images corresponding to sources over the field of view. A planar detector is located at a plane at or near positions where the line images over the field of view are produced, so that a component of the angular direction of the source can be determined from the position of the line image on the detector.

10 Claims, 1 Drawing Sheet

CYLINDRICAL WIDE FIELD RECEIVER ELEMENT

FIELD OF THE INVENTION

The present invention is concerned with the field of optical receiver elements of the type used to determine the direction of a distant source of electromagnetic radiation over a wide field of view.

BACKGROUND OF THE INVENTION

Laser threat warning receivers must have wide fields of view in order to determine the direction of laser radiation from a distant source. However, it is also desirable that such receivers have high sensitivity and angular resolution so that the direction of the distant laser source can be determined. In the prior art, a slit aperture has been used in order to pass the radiation to a curved array of detectors. Because the detectors are not in a flat plane, however, the manufacturing of such devices is not as simple as has been desired. Further, as no optical elements are used to increase the density of radiation on the detectors, sensitivity is thereby limited. Where wide fields of view are of concern, the focusing of radiation onto a flat plane with a small image blur, prior to the present invention, has been a difficult problem, and no simple rugged system for use in determining the direction of such distant sources over wide fields of view is known.

SUMMARY OF THE INVENTION

In the present invention, a cylindrical reflecting surface is used in a far off-axis configuration to focus radiation incident upon the aperture of the system. An array of detectors is used in order to detect the line images formed by the cylindrical reflecting surface. The cylindrical reflecting surface is oriented with respect to the input aperture to form line images across the entire field of view on one side of the input aperture, with the detector array located in a plane such that the array is at or close to the positions of the line images representing sources over the entire field of view of the receiver. With the use of a cylindrical reflecting surface in an off-axis configuration, as in the present invention, such a plane at which the images are sufficiently focused to allow sufficient resolution exists, notwithstanding that the precise lines of focus for such surfaces are not, over the entire field of view, in a single plane.

In the preferred embodiment, the present invention has lateral reflecting surfaces that are perpendicular to the axis of a circular cylindrical reflecting surface and which extend from each side of the input aperture to the cylindrical reflecting surface and the detector array. For sources emanating from directions other than those located on the plane perpendicular to the axis of the cylindrical reflecting surface and extending through the center of the input aperture, the lateral reflecting surfaces may direct radiation from such sources to the detectors. In a preferred embodiment of the present invention the input aperture, the cylindrical reflecting surface, the lateral sides and the surface at which the detectors are located are sides of a block of material that is optically transparent to the radiation of concern with the detector array mounted directly on the block.

DESCRIPTION OF THE PREFERRED EMBODIMENT

Figure 1:
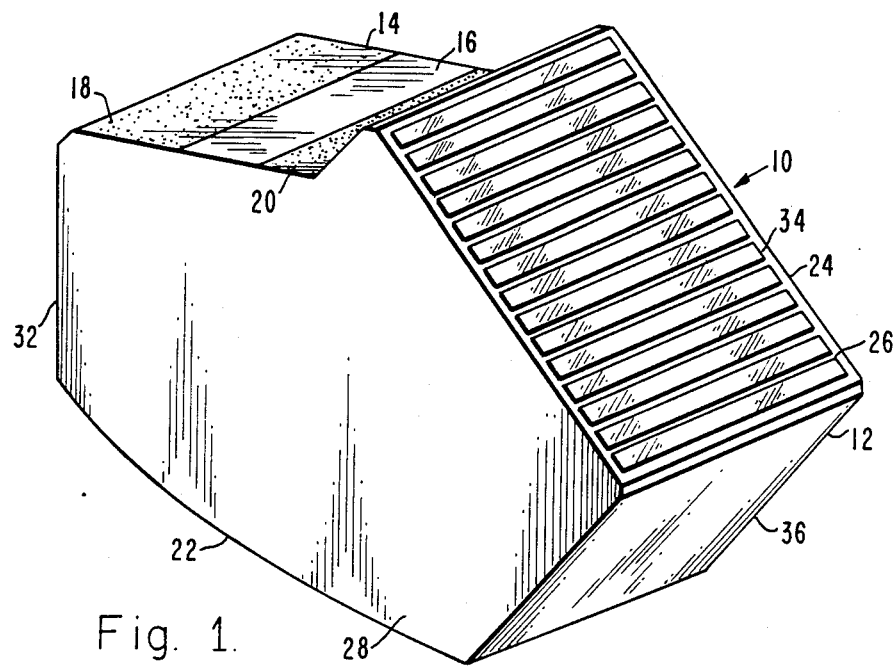
FIG. 1 is a perspective view of a preferred embodiment of the receiver of the present invention.

Referring first to FIG. 1 showing a preferred embodiment of the receiver 10 of the present invention in a perspective view, a solid block 12 of material which is optically transmissive at the wavelengths of concern is shown. Optical block 12 contains an entrance aperture surface 14 containing an optically polished entrance aperture 16 on each side of which are optically non-transmissive surface portions 18 and 20. Entrance aperture 16 extends across the width of block 12 and is the means by which electromagnetic radiation enters the receiver 10. The side of block 12 generally opposite to the entrance aperture surface 14 is a mirrored cylindrical reflecting surface 22.

Figure 2:
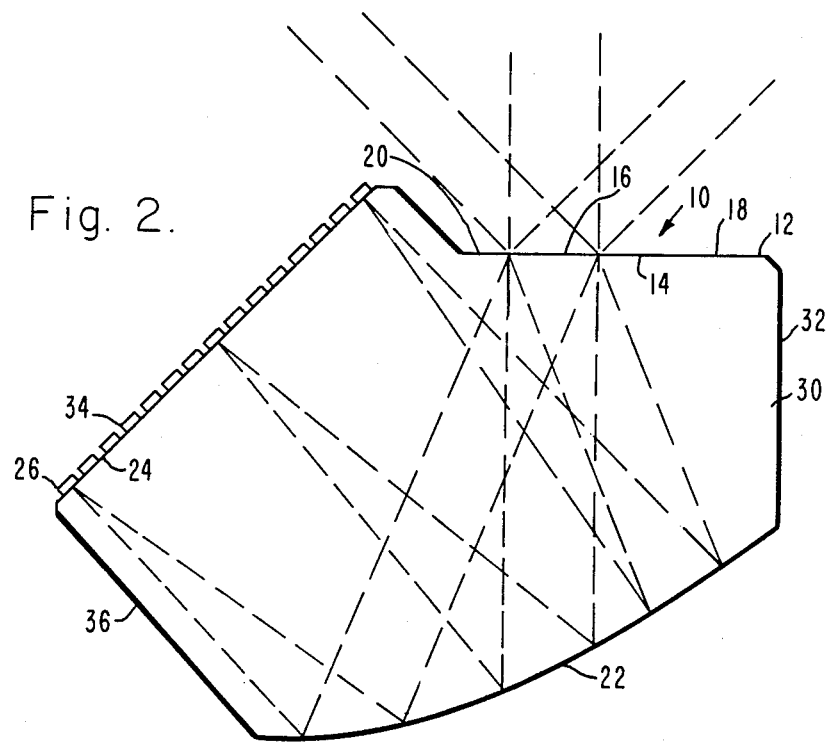
FIG. 2 is a side view of the preferred embodiment of the receiver of the present invention shown in FIG. 1 with dashed lines indicating the paths of exemplary rays from optical sources at different angles within the field of view of the receiver.

In the preferred embodiment, the surface 22 is a circular cylindrical surface having an axis parallel to the length of entrance aperture 16. This axis is offset from the entrance aperture 16 such that a radius of the cylindrical reflecting surface 22 is not perpendicular to the entrance aperture surface 14 at the entrance aperture 16. As shown in FIG. 2, radiation incident on entrance aperture 16 is therefore reflected by cylindrical reflective surface 22 to one side of entrance aperture 16.

The radius of curvature of cylindrical reflecting surface 22 is selected so that radiation over the entire field of view in a plane parallel to the axis of the cylindrical reflecting surface 22 is incident upon surface 22 and is reflected to line images to the side of entrance aperture 16 that are nearly located in a single plane. The detector surface plane 24 is therefore selected to be a flat surface the points of which are at or close to the positions at which these line images are brought to a focus. Preferably, the detector surface 24 is located so that a uniform blur spot is obtained at the surface 24 over the entire field of view of the receiver 10.

An array 26 of detectors 34 sensitive to the radiation of concern that is transmitted through block 12 are located on detector surface 24. In the preferred embodiment, the detector array 26 is optically and physically bonded to the surface 24 of block 12.

The number of detectors 34 in the detector array 26 depends on the angular resolution desired and the physical dimensions of the receiver 10. In one preferred embodiment, for example, the detectors 34 are selected to be approximately twice the size of the approximately uniform blur spot produced at the detector surface 24 from sources over the field of view in the plane perpendicular to the axis of the cylindrical reflective surface 22 and extending through the center of the entrance aperture 16.

The relationship between the entrance aperture 16, the cylindrical reflecting surface 22, and the detector surface 24 in the off-axis configuration of the present invention can be understood by first considering the case where an entrance aperture is centered on a radius of a circular cylindrical surface at the plane of "best focus." In this configuration, however, the plane of best focus where one would like to locate the detector surface would block radiation through the aperture. As the entrance aperture shifts to one side, the plane of "best focus" tilts and moves to the side of the entrance aperture. Depending on the angular field of view desired, a point is reached where the detector surface does not block the entrance aperture, such as in the configuration shown in FIG. 2. The distance between the aperture and the cylindrical surface for rays centered in the field of view is on the same order of magnitude as, and preferably about equal to, the distance between the cylindrical reflecting surface and the detector surface.

If the reflecting surface is spherical, the images would be quite blurred. If the surface is cylindrical, an aperture location and focal plane orientation can be found where the line images are reasonably good. The geometry is best optimized using ray trace programs on a digital computer, although accurate sketches can assist greatly in finding a design with the proper features.

Lateral surfaces 28 and 30 of block 12 are parallel to each other and perpendicular to the axis of the cylindrical reflecting surface 22. Lateral surfaces 28 and 30 are reflective so that radiation from sources outside of the plane perpendicular to the axis of the cylindrical reflecting surface 22 extending through the center of the entrance aperture 16 (herein referred to as the "first plane") will have line images formed on the detector array 26 after reflecting off of one or more of the lateral surfaces 28 and 30. The lateral surfaces 28 and 30 result in the receiver 10 having a field of view for directions in the plane orthogonal to the first plane and to the entrance aperture 16 that is quite wide, as sources having an angular component in such plane may be reflected off of the lateral surfaces 28 and 30 and directed to the detector array 26. The receiver 10, however, is not intended to provide information with respect to such component of the direction of a source. If such information is desired, another receiver 10 may be utilized, with the second receiver 10 being rotated relative to the first receiver by an angle of 90 degrees.

The end surfaces 32 and 36 of block 12 are not used for the reflection of radiation and are preferably optically black.

While the preferred embodiment has been described in terms of a receiver 10 which utilizes an optically transmitting block 12 on which the various surfaces, including the cylindrical reflective surface 22 and the detector surface 24 are located, no such block of material need be used in the present invention. In certain embodiments, it may be preferred to have the area between the surfaces be air or a vacuum.

Similarly the cylindrical surface 22 need not be circular cylindrical as in the preferred embodiment described; surface 22 may, for example, be parabolic in cross-section.

What is claimed is:

1. A receiver having a wide field of view in two dimensions and which provides electrical signals indicative of the direction, projected onto a first plane, of a source of electromagnetic radiation within the field of view of the receiver comprising:

a first surface containing an input aperture intersecting said first plane;

a convex cylindrical reflective second surface located generally opposite said aperture and oriented along an axis perpendicular to said first plane, said second surface oriented to reflect radiation within said field of view passing through said aperture to one side of said aperture, said second surface configured and oriented to reflect radiation from sources appearing within the field of view of the receiver to form line images, the location of a line image being dependent upon the direction of the corresponding source; and a detector means located along a flat third surface, said detector means oriented with respect to said reflective second surface to correspond to locations at which line images from sources in said plane and within said field of view are at or near focus, such that line images from sources from different directions projected onto said first plane within said wide field of view vary in location in a direction parallel to said first plane on said detector means, said detector means providing an electrical signal indicative of the direction of a source projected onto said first plane.

2. A receiver as in claim 1 further comprising:

fourth and fifth lateral reflecting surfaces, said surfaces located on opposite sides of said input aperture, said convex cylindrical second surface and said third surface, said fourth and fifth lateral surfaces extending therebetween to reflect radiation from sources not located in said plane within said field of view to said detector means.

3. A receiver as in claim 1 wherein said detector means comprises a linear array of detectors extending in a direction parallel to said first plane.

4. A receiver as in claim 1 wherein said fourth and fifth surfaces are planar and parallel to said first plane.

5. A receiver as in claim 2 wherein said first, second, third, fourth, and fifth surfaces are sides of a block of material that is optically transmitting for radiation which is to be detected by said detector means.

6. A receiver as in claim 1 wherein said cylindrical reflective surface is a circular cylindrical reflective surface.

7. A receiver as in claim 6 further comprising:

fourth and fifth lateral reflecting surfaces, said surfaces located on opposite sides of said input aperture, said convex cylindrical second surface and said third surface, said fourth and fifth lateral surfaces extending therebetween to reflect radiation from sources not located in said plane within said field of view to said detector means.

8. A receiver as in claim 6 wherein said third surface is planar and said detector means comprises a linear array of detectors arranged on said surface.

9. A receiver as in claim 6 wherein said fourth and fifth surfaces are planar and parallel to said first plane.

10. A receiver as in claim 6 wherein said first, second, third, fourth, and fifth surfaces are sides of a block of material that is optically transmitting for radiation which is to be detected by said detector means.

* * * * *